United States Patent [19]
Rapparini

[11] Patent Number: 5,369,941
[45] Date of Patent: Dec. 6, 1994

[54] VERTICAL PACKAGING MACHINE WITH TWO OPPOSITE FORMING TUBES

[75] Inventor: Gino Rapparini, Bologna, Italy

[73] Assignee: ICA S.p.A., Bologna, Italy

[21] Appl. No.: 121,155

[22] Filed: Sep. 13, 1993

[30] Foreign Application Priority Data

Mar. 11, 1991 [IT] Italy ................ BO 91 A 000067

[51] Int. Cl.⁵ ................ B65B 9/20; B65B 51/14
[52] U.S. Cl. ................ 53/546; 53/552; 53/374.7
[58] Field of Search ........... 53/202, 546, 551, 552, 53/374.7, 451

[56] References Cited

U.S. PATENT DOCUMENTS

| | | | |
|---|---|---|---|
| 1,986,422 | 1/1935 | Zwoyer | 53/546 X |
| 2,237,119 | 4/1941 | Smith | 53/546 X |
| 3,250,055 | 5/1966 | Schafer, Jr. | 53/546 |
| 3,449,888 | 6/1969 | Gausman | 53/552 |
| 3,724,163 | 4/1973 | Roussel | 53/546 X |
| 4,081,943 | 4/1978 | Leasure et al. | |
| 4,269,016 | 5/1981 | Kopp et al. | 53/546 |
| 4,552,613 | 11/1985 | Auer | 53/551 X |
| 4,628,670 | 12/1986 | Kondo et al. | 53/551 |

FOREIGN PATENT DOCUMENTS 2250676  6/1975  France .
2703455  10/1977  Germany .

*Primary Examiner*—Horace M. Culver
*Attorney, Agent, or Firm*—Horst M. Kasper

[57] ABSTRACT

The invention relates to a packaging machine made up of two vertical packaging groups (1 and 2) set on the opposite sides (3 and 4) of a central structure (5) equipped with a horizontal bilateral station (6) that carries out the transversal sealing of both resulting packets (15 and 16). Compared with the utilization of two different packaging machines, this structure allows smaller overall dimensions, cheapness and an easier way of realization and use, even making two packets with different features simultaneously.

11 Claims, 2 Drawing Sheets

VERTICAL PACKAGING MACHINE WITH TWO OPPOSITE FORMING TUBES

CROSS-REFERENCE TO RELATED APPLICATIONS

This application is a continuation-in-part application of another international application filed under the Patent Cooperation Treaty Mar. 4, 1992, bearing Application No. PCT/IT92/00022, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The invention relates to the manufacturing field of packaging machines, where a vertical packaging machine includes two opposite forming tubes.

2. Brief Description of the Background of the Invention Including Prior Art

Packaging machines with only one forming tube made up of one vertical packaging group set on the frontal face of a supporting structure are well known in the art. Said structure is equipped with a horizontal station that performs the transversal sealing of the packets or packages through a thermosealing pincer. In these packaging machines, the film comes from a roll, wraps itself up in the forming tube, and is welded longitudinally. This continuous tube of flexible material is pushed down by adherent belts and is filled upwards with the conditioning products to obtain finished packets by using a thermosealing pincer.

The possibility of disposing two vertical packaging machines side by side is also known in the art.

The French Patent document 2,250,676, the German Patent document DE 2,703,455, and the U.S. Pat. No. 4,081,943 teach packaging machines of a type which could represent prior art in the context of this application.

The British Patent document 1,065,144 discloses a vertical packaging machine with two opposite forming tubes 4,4, said packaging machine being made up of two different and separate vertical packaging groups, which are set on the opposite sides of a central structure 12, 22 that is equipped with a horizontal bilateral station 20 that carries out the transversal sealings of both resulting packets or packages, which are produced in a single transverse sealing step.

The configurations of the French Patent document 2,250,676, the German Patent document DE 2,703,455, the U.S. Pat. No. 4,081,943, and the British Patent document 1,065 144, respectively, are made up of two different vertical forming groups disposed side by side on the same wall of the supporting structure.

Each forming group according to this art is served by its own sealing transversal station.

In particular, the British Patent document 1,065,144 shows only one clamp which is elongated to hug both forming tubes. Said elongated clamp is set for two motions, the first motion being a vertical motion to go up and down and the second motion being a horizontal motion to open and to close. The clamp closes at the top dead center and then pulls with it the packaging materials in the downward motion. When the clamp reaches the dead bottom center, the clamp opens and goes up to reach the top dead center again. The kinematic motions and the structural choices described and illustrated in the above-cited references imply a cumbersome and uneconomical configuration with an unsatisfactory performance.

The structure shown in the British Patent document 1,065,144 presents only one frontal wall equipped with a pair of forming groups. Said groups are of necessity set side by side. The operational packaging cycle taught in the British Patent document 1,065,144 is by necessity only one, having only one elongated clamp 20 to work on both tubes of packaging material at the same time. Since only one packaging cycle is provided, the time of the upward motion is useless idle time. The open-shut motion of the elongated clamp 20 of the British Patent document 1,065,144 is performed by the rotation of the shaft 12. But this rotation of the shaft 12 is necessarily alternating. This alternating rotation is obtained with a chain pulled by the cam 82.

SUMMARY OF THE INVENTION

1. Purposes of the Invention

It is an object of the present invention to provide for a machine with two forming tubes and one single transversal sealing station which is of small and compact overall dimensions and allows an improved and economical performance.

These and other objects and advantages of the present invention will become evident from the description which follows.

2. Brief Description of the Invention

The present invention provides for a vertical form-fill-sealing packaging machine comprising supply means for a first web and for a second web. A central frame is disposed below the supply means. A first forming shoulder is disposed on a first side of the central frame for forming the first web into a tubular shape. A second forming shoulder is disposed on a second side of the central frame for forming the first web into a tubular shape. The second side is disposed diametrically opposite to the first side. A first longitudinal sealing means for the first web is disposed at the first lateral side of the central frame for sealing lateral edges of the first web and thereby forming a first tube from the first web. A second longitudinal sealing means for the second web is disposed at the second lateral side of the central frame for sealing lateral edges of the second web and thereby forming a second tube from the second web. A first sealing device includes a pair of sealing and countersealing means. A second sealing device includes a pair of sealing and countersealing means. A first tube feeding means is disposed between the first longitudinal sealing means and the first sealing device for stepwise feeding the first tube in a predetermined packaging length into the first sealing device to provide a transverse sealing of an annular area of the first tube to be transformed into a package. A second tube feeding means is disposed between the second longitudinal sealing means and the second sealing device for stepwise feeding the second tube in a predetermined packaging length into the second sealing device to provide a transverse sealing of an annular area of the second tube to be transformed into a package. A stationary central sealing station is mounted in the central frame and has a first lateral side and a second lateral side. The first lateral side of the stationary central sealing station is disposed opposite to the second lateral side of the stationary central sealing station. The first sealing device is disposed on the first lateral side of the stationary central sealing station. The second sealing device is disposed on the second lateral side of the stationary central sealing station. The transverse sealing is provided as a result of the pairs of sealing and countersealing means of the first sealing device and of the second sealing device being alternatingly moved into an engagement position with a respective tube inducing sealing of the respective tube.

The first forming shoulder, the first longitudinal sealing means, the first sealing device and the first tube feeding means can form a first tube form-fill and sealing group disposed at a distance along the first side of the central frame. The second forming shoulder, the second longitudinal sealing means, the second sealing device and the second tube feeding means can form a second tube form-fill and sealing group disposed at a distance along the second side of the central frame.

The supply means can slit a single web of packaging material into the first web having two lateral edges and into the second web each having two lateral edges. A cross bar can be disposed between the supply means and the central frame.

A rotatable center shaft can be disposed within an area confined by the central frame. Cam means can be moved by the rotatable center shaft and can cooperate with the pair of sealing and countersealing means of the first sealing device and with the pair of sealing and countersealing means of the second sealing device to provide alternating and reciprocating motions adapted to form a sealing end to a respective one of the first tube and of the second tube.

A first support rod can have a first end and a second end and can be supported in the central frame. A second support rod can have a first end and a second end and can be supported in the central frame. The sealing and countersealing means of the first sealing device can be formed at the first end of the first support rod and at the first end of the second support rod. The sealing and countersealing means of the second sealing device can be formed at the second end of the first support rod and at the second end of the second support rod and thus can be provided at respective opposite ends of a respective one of the first support rod and of the second support rod. A cam means can be formed by a first cam plate and by a second cam plate. A first cam follower can be disposed on the first support rod. The first cam follower can engage with the first cam plate. A second cam follower can be disposed on the second support rod. The second cam follower can engage with the second cam plate.

According to the present invention, a central structure with two opposite walls is provided, wherein each of the opposite walls is each equipped with a forming group. Therefore, the forming groups are set back-to-back with respect to the central structure.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
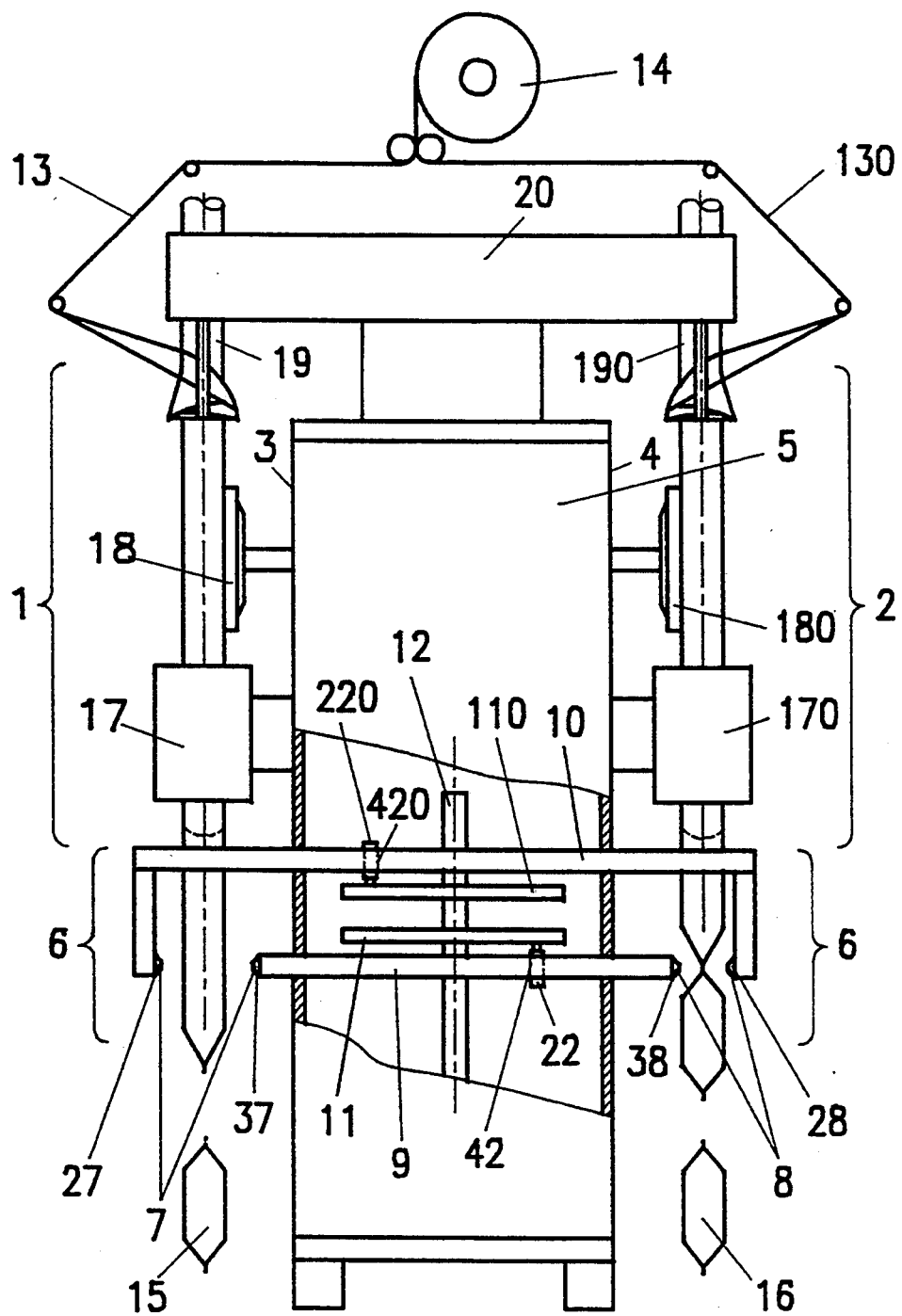
FIG. 1 is a schematic view onto a packaging machine.
Figure 2:
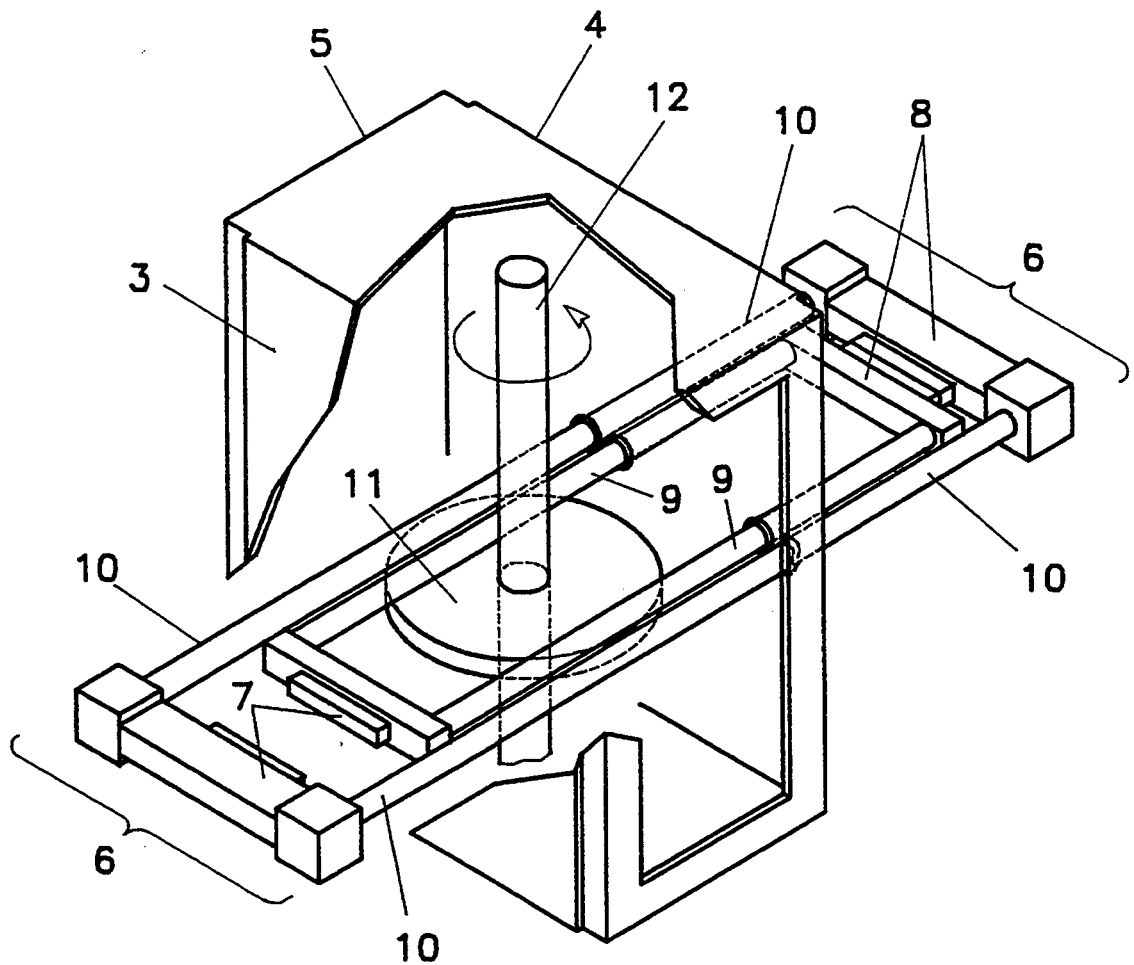
FIG. 2 is a perspective view of a motion device of clamps.

According to the present invention, there is provided for a vertical form-fill-sealing packaging machine. A first vertical packaging group or tube form-fill and sealing group 1 is disposed at a distance along a left side or first lateral side 3 of a central structure or central frame 5. A second vertical packaging group or tube form-fill and sealing group 2 is disposed at a distance along a right side or second lateral side 4 of the central frame 5. The first lateral side 3 of central frame 5 is disposed opposite to the second lateral side 4 of the central frame 5. A roll or single web 14 of packaging material is slit into a first flexible packaging material web 13 having two lateral edges and a second flexible packaging material web 130 having two lateral edges. A first vertical forming tube or forming shoulder 19 is provided to form the first web 13 into a tubular shape. A first sealing device or longitudinal sealing means 18 is disposed at the first lateral side 3 of the central frame 5 and seals the lateral edges of the first web 13 for forming a tube. A first thermosealing clamp pair or sealing device 7 includes a pair of sealing and countersealing means, formed by a first outer clamp 27 and a first inner clamp 37. A first vertical drive belt or web feeding means 17 is provided for stepwise feeding the first web 13 formed into a tube in a predetermined packaging length into the first sealing device 7 to provide a transverse sealing of the lateral edges of the first web 13 formed into a tube to be transformed into a package. A second vertical forming tube or forming shoulder 190 forms the second web 130 into a tubular shape. A second sealing device or longitudinal sealing means 180 is disposed at the second lateral side 4 of the central frame 5 and seals the lateral edges of the second web 130 for forming a tube. A second thermosealing clamp pair or sealing device 8 includes a pair of sealing and countersealing means, formed by a second outer clamp 28 and a second inner clamp 38. A second vertical drive belt or web feeding means 170 is provided for stepwise feeding the second web 130 formed into a tube in a predetermined packaging length into the second sealing device 8 to provide a transverse sealing of the lateral edges of the second web 130 formed into a tube to be transformed into a package. The transverse sealing is provided as a result of the pairs of sealing and countersealing means of the sealing devices 7, 8 being alternatingly moved into an engagement position with the tube. A bilateral horizontal station or stationary central sealing station 6 is mounted in the central frame 5 and has a first lateral side and having a second lateral side. The first lateral side of the stationary central sealing station 6 is disposed opposite to the second lateral side of the stationary central sealing station 6. The first sealing device 7 is disposed on the first lateral side of the stationary central sealing station 6. The second sealing device 8 is disposed on the second lateral side of the stationary central sealing station 6.

A rotatable center shaft 12 can be disposed within the area confined by the central structure frame 5. Cam means can be formed by a first cam plate 11 and by a second cam plate 110 and can move the rotatable center shaft 12 and can cooperate with the pairs of sealing and countersealing means of the sealing devices 7, 8 to provide alternating and reciprocating motions.

A first connection rod or support rod 9 can have a first end and a second end and can be supported in the central frame 5. A second connection rod or support rod 10 can have a first end and a second end and can be supported in the central frame 5. The sealing and countersealing means of the first sealing device 7 can be formed at the first end of the first support rod 9 and at the first end of the second support rod 10. The sealing and countersealing means of the second sealing device 8 can be formed at the second end of the first support rod 9 and at the second end of the second support rod 10. A first pin or cam follower 22 can be disposed on the first support rod 9. The first cam follower 22 can engage with the first cam plate 11. A second cam follower 220 can be disposed on the second support rod 10. The second cam follower 220 can engage with the second cam plate 110.

A vertical form-fill-sealing packaging machine comprises two separate tube form-fill and sealing groups 1, 2 on opposite sides of a packaging machine which is fed by a single web 14 of packaging material slit into two webs 13. Each of said form-fill-sealing groups comprises a forming shoulder 19 to form said web into a tubular shape, a longitudinal sealing means 18, a web feeding means 17 for stepwise feeding the tube in predetermined packaging lengths into a sealing device 7, 8 to provide the transverse seal of the package. The sealing devices 7, 8 are mounted on opposite lateral sides of a stationary central sealing station 6 mounted in a central frame 5. Each sealing device comprises a pair of horizontally reciprocal sealing and countersealing means 7, 8. The pairs of said sealing devices are being moved alternatively into a tube engagement position to provide the transversal package seal.

A central rotatable shaft 12 can carry cam means 11 cooperating with the pairs of sealing and countersealing means 7, 8 to provide said alternate reciprocating motions.

Both, the sealing and countersealing means 7, 8, can be provided at respective opposite ends of supporting rods 9, 10. Each of said rods can carry a cam follower engageable with said cam means 11.

The packaging machine illustrated in FIG. 1 shows that a first vertical packaging group 1 is disposed on the left-hand side of the packaging machine of FIG. 1. A second vertical packaging group 2 is disposed on the right-hand side of the packaging machine. A central structure 5 of the packaging machine includes a left side 3 and a right side 4. The central structure 5 is disposed between the first vertical packaging group 1 and the second vertical packaging group 2. A bilateral horizontal station for the transversal thermosealings is designated with the reference numeral 6. The bilateral horizontal station 6 is disposed between the central structure 5 and the first vertical packaging group 1 and the second vertical packaging group 2. The present invention provides for clamp pairs 7, 8. A first clamp pair is disposed on a first side of the central structure and a second clamp pair is disposed on a second side of the central structure. The two clamp pairs 7, 8 are set for horizontal motion only. The first thermosealing clamp pair 7 including a first outer clamp 27 and a first inner clamp 37 is disposed on the left side of the bilateral horizontal station 6 and the second thermosealing clamp pair 8 including a second outer clamp 28 and a second inner clamp 38 is disposed on the right side of the bilateral horizontal station 6. A first connection rod 9 is disposed between the inside jaws of the first thermosealing clamp pair 7 including the first inner clamp 37 and of the second thermosealing clamp pair 8 including the second inner clamp 38. A second connection rod 10 is disposed between the outside jaws of the first thermosealing clamp pair 7 and of the second thermosealing clamp pair 8. In particular, the second connection rod 10 connects the first outer clamp 27 and the second outer clamp 28. A central shaft 12 provides for the kinematic motion by means of cam plates 11, 110, where the cam plates 11, 110 provide the translatory motion of the connection rods 9, 10. A roll 14 of a band of flexible packaging material is disposed on top of the packaging machine and in particular above the central structure 5. The roll 14 includes a first flexible packaging material web 13 and a second flexible packaging material web 130. A first package 15 is finished by the first thermosealing clamp pair 7 in the bilateral horizontal station 6. A second package 16 is finished by the second thermosealing clamp pair 8 in the bilateral horizontal station 6. The first clamp pair 7 is linked with the second clamp pair 8 by means of the first connection rod 9 and the second connection rod 10 allows the accomplishment of both complementary cycles eliminating any idle time. Any translation of the rods 9, 10 towards one sense or the other produces always an active stroke in both operational cycles.

A cross bar 20 supports a first vertical forming tube 19 and a second vertical forming tube 190. The cross bar 20 is located between the roll 14 and the central structure 5. A first vertical forming tube 19 is attached to the cross bar 20 and forms part of the first vertical packaging group 1. A second vertical forming tube 190 is attached to the cross bar 20 and forms part of the second vertical packaging group 2.

The first flexible packaging material web 13 is formed into a tubular shape by the first vertical forming tube 19 and the longitudinal edges of the tubular-shaped web are sealed by a first sealing device 18. The second flexible packaging material web 130 is formed into a tubular shape by the second vertical forming tube 190 and the longitudinal edges of the tubular-shaped web are sealed by a second sealing device 180.

The back-to-back configuration of the sealing operation with bilateral clamps allows the invention apparatus to use the central shaft 12 with a continuous rotation.

A first vertical drive belt 17 forms part of the first vertical packaging group 1 and is coordinated to the first sealing device 18. A second vertical drive belt 170 forms part of the second vertical packaging group 2 and is coordinated to the second sealing device 180. The packaging materials are pushed down by the first vertical drive belt 17 forming part of the first vertical packaging group 1 and by the second vertical drive belt 170 forming part of the second vertical packaging group 2.

It can be recognized and seen in detail in FIG. 1 that the bilateral horizontal station 6 is able to perform a transversal sealing both on the left side 3 and the right side 4 of the central structure 5. The operational cycle is performed in two distinct packaging cycles, a first packaging cycle on the left side 3 and a second packaging cycle on the right side 4. While the second clamp pair 8 on the right side 4 shuts to seal, the first clamp pair 7 on the left side 3 opens to allow the packaging material to feed through the drive belt 17.

The connection rods 9, 10 traverse the central structure 5 and protrude on the left side 3 of the central structure 5 and on the right side 4 of the central structure 5. The extremity of the second connection rod 10 disposed on the side of the first vertical packaging group 1 forms the outside jaw including a first outer clamp 27 of the first clamp pair 7 and the extremity of the first connection rod 9 disposed on the side of the first vertical packaging group 1 forms the inner jaw including a first inner clamp 37 of the first clamp pair 7. The extremity of the second connection rod 10 disposed on the side of the second vertical packaging group 2 forms the outside jaw including a second outer clamp 28 of the second clamp pair 8 and the extremity of the first connection rod 9 disposed on the side of the second vertical packaging group 2 forms the inner jaw including a second inner clamp 38 of the second clamp pair 8.

The connection rods 9 and 10, instead of linking both inside and outside jaws of the clamp pairs, can link alternatively one inside jaw with one outside jaw.

Through the kinematic motions of the cam plates 11, 110, the rotation of the central shaft 12 induces a translation motion of the connection rods 9 and 10 in order to open and close both clamp pairs 7 and 8.

The first connection rod 9 is driven by a cam plate 11 having attached a pin 22. The pin 22 engages a hole 42 providing a cam follower in the first connection rod 9. The second connection rod 10 is driven by a cam plate 110 having attached a pin 220. The pin 220 engages a hole 420 providing a cam follower in the second connection rod 10. Alternatively, a respective cam plate 11, 110 can be provided with a hole into which a pin attached to a respective connection rod (9, 10) engages. This structure allows to provide a strictly reciprocal motion of the respective connection rod 9, 10.

The advantage obtained through the bilateral station 6 of this configuration is evident. Compared with the utilization of two conventional stations, this present, original solution allows for having smaller overall dimensions, low-cost equipment and an easier way of realization and use, and even provides for making simultaneously two packages, possibly each associated with different features.

This invention of course is susceptible of several changes of achievement, both concerning the proportions and technological choices of the manufacturing material.

The kinematic motions of the transversal sealing clamps, such as clamps 27, 37, 28, 38 can be obtained using electropneumatic devices inducing motion in at least one of a pair of clamps engaging a packaging web.

In the area of this invention will be comprised all vertical packaging machines with two opposite forming tubes made up of two vertical packaging groups disposed on opposite sides of a central structure equipped with one bilateral station that performs the transversal sealings of both resulting packets and or packages.

It will be understood that each of the elements described above, or two or more together, may also find a useful application in other types of packaging machines differing from the types described above.

While the invention has been illustrated and described as embodied in the context of a vertical packaging machine with two opposite forming tubes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A vertical form-fill-sealing packaging machine comprising supply means for a first web and for a second web;

a central frame disposed below the supply means;

a first forming shoulder disposed on a first side of the central frame for forming the first web into a tubular shape;

a second forming shoulder disposed on a second side of the central frame for forming the first web into a tubular shape, wherein the second side is disposed diametrically opposite to the first side;

a first longitudinal sealing means for the first web disposed at the first lateral side of the central frame for sealing lateral edges of the first web and thereby forming a first tube from the first web;

a second longitudinal sealing means for the second web disposed at the second lateral side of the central frame for sealing lateral edges of the second web and thereby forming a second tube from the second web;

a first sealing device including a pair of sealing and countersealing means;

a second sealing device including a pair of sealing and countersealing means;

a first tube feeding means disposed between the first longitudinal sealing means and the first sealing device for stepwise feeding the first tube in a predetermined packaging length into the first sealing device to provide a transverse sealing of an annular area of the first tube to be transformed into a package;

a second tube feeding means disposed between the second longitudinal sealing means and the second sealing device for stepwise feeding the second tube in a predetermined packaging length into the second sealing device to provide a transverse sealing of an annular area of the second tube to be transformed into a package;

a stationary central sealing station mounted in the central frame and having a first lateral side and having a second lateral side, wherein the first lateral side of the stationary central sealing station is disposed opposite to the second lateral side of the stationary central sealing station, wherein the first sealing device is disposed on the first lateral side of the stationary central sealing station, and wherein the second sealing device is disposed on the second lateral side of the stationary central sealing station;

wherein the transverse sealing is provided as a result of the pairs of sealing and countersealing means of the first sealing device and of the second sealing device being alternatingly moved into an engagement position with a respective tube inducing sealing of the respective tube.

2. The vertical form-fill-sealing packaging machine according to claim 1, wherein the first forming shoulder, the first longitudinal sealing means, the first sealing device and the first tube feeding means form a first tube form-fill and sealing group disposed at a distance along the first side of the central frame;

wherein the second forming shoulder, the second longitudinal sealing means, the second sealing device and the second tube feeding means form a second tube form-fill and sealing group disposed at a distance along the second side of the central frame.

3. The vertical form-fill-sealing packaging machine according to claim 1, wherein the supply means slits a single web of packaging material into the first web having two lateral edges and into the second web each having two lateral edges; and further comprising
a cross bar disposed between the supply means and the central frame.

4. The vertical form-fill-sealing packaging machine according to claim 1, further comprising
a rotatable center shaft disposed within an area confined by the central frame;
cam means movable by the rotatable center shaft and cooperating with the pair of sealing and countersealing means of the first sealing device and with the pair of sealing and countersealing means of the second sealing device to provide alternating and reciprocating motions adapted to form a sealing end to a respective one of the first tube and of the second tube.

5. The vertical form-fill-sealing packaging machine according to claim 4, further comprising
a first support rod having a first end and a second end and supported in the central frame;
a second support rod having a first end and a second end and supported in the central frame, wherein the sealing and countersealing means of the first sealing device are formed at the first end of the first support rod and at the first end of the second support rod, and wherein the sealing and countersealing means of the second sealing device are formed at the second end of the first support rod and at the second end of the second support rod and thus are provided at respective opposite ends of a respective one of the first support rod and of the second support rod;
a cam means formed by a first cam plate and by a second cam plate;
a first cam follower disposed on the first support rod, wherein the first cam follower engages with the first cam plate;
a second cam follower disposed on the second support rod, wherein the second cam follower engages with the second cam plate.

6. A vertical form-fill-sealing packaging machine comprising
a central frame (5);
a first tube form-fill and-sealing group (1) disposed at a distance along a first lateral side (3) of the central frame (5);
a second tube form-fill and sealing group (2) disposed at a distance along a second lateral side (4) of the central frame (5), wherein the first lateral side (3) of central frame (5) is disposed opposite to the second lateral side (4) of the central frame (5);
a single web (14) of packaging material slit into a first web (13) having two lateral edges and a second web (130) having two lateral edges;
a first forming shoulder (19) to form the first web (13) into a tubular shape;
a first longitudinal sealing means (18) disposed at the first lateral side (3) of the central frame (5) and sealing the lateral edges of the first web (13) for forming a tube;
a first sealing device (7) including a pair of sealing and countersealing means;
a first web feeding means (17) for stepwise feeding the first web (13) formed into a tube in a predetermined packaging length into the first sealing device (7) to provide a transverse sealing of the lateral edges of the first web (13) formed into a tube to be transformed into a package;
a second forming shoulder (190) to form the second web (130) into a tubular shape;
a second longitudinal sealing means (180) disposed at the second lateral side (4) of the central frame (5) and sealing the lateral edges of the second web (130) for forming a tube;
a second sealing device (8) including a pair of sealing and countersealing means;
a second web feeding means (170) for stepwise feeding the second web (130) formed into a tube in a predetermined packaging length into the second sealing device (8) to provide a transverse sealing of the lateral edges of the second web (130) formed into a tube to be transformed into a package,
wherein the transverse sealing is provided as a result of the pairs of sealing and countersealing means of the sealing devices (7, 8) being alternatingly moved into an engagement position with the tube;
a stationary central sealing station (6) mounted in the central frame (5) and having a first lateral side and having a second lateral side, wherein the first lateral side of the stationary central sealing station (6) is disposed opposite to the second lateral side of the stationary central sealing station (6), wherein the first sealing device (7) is disposed on the first lateral side of the stationary central sealing station (6), and wherein the second sealing device (8) is disposed on the second lateral side of the stationary central sealing station (6).

7. The vertical form-fill-sealing packaging machine according to claim 6, further comprising
a rotatable center shaft (12) disposed within the area confined by the central structure frame (5);
cam means formed by a first cam plate (11) and by a second cam plate (110) and moving the rotatable center shaft (12) and cooperating with the pairs of sealing and countersealing means of the sealing devices (7, 8) to provide alternating and reciprocating motions.

8. The vertical form-fill-sealing packaging machine according to claim 7, further comprising
a first support rod (9) having a first end and a second end and supported in the central frame (5);
a second support rod (10) having a first end and a second end and supported in the central frame (5), wherein the sealing and countersealing means of the first sealing device (7) are formed at the first end of the first support rod (9) and at the first end of the second support rod (10), and wherein the sealing and countersealing means of the second sealing device (8) are formed at the second end of the first support rod (9) and at the second end of the second support rod (10);
a first cam follower (22) disposed on the first support rod (9), wherein the first cam follower (22) engages with the first cam plate (11);

a second cam follower (220) disposed on the second support rod (10), wherein the second cam follower (220) engages with the second cam plate (110).

9. A vertical form-fill-sealing packaging machine comprising two separate tube form-fill and sealing groups (1, 2) on opposite sides of a packaging machine which is fed by a single web (14) of packaging material slit into two webs (13), each of said form-fill-sealing groups comprising a forming shoulder (19) to form said web into a tubular shape, a longitudinal sealing means (18), a web feeding means (17) for stepwise feeding the tube in predetermined packaging lengths into a sealing device (7, 8) to provide the transverse seal of the package characterized in that the sealing devices (7, 8) are mounted on opposite lateral sides of a stationary central sealing station (6) mounted in a central frame (5), and in that each sealing device comprises a pair of horizontally reciprocal sealing and countersealing means (7, 8), the pairs of said sealing devices being moved alternatively into a tube engagement position to provide the transversal package seal.

10. Vertical form-fill-sealing packaging machine according to claim 9, wherein a central rotatable shaft (12) carries cam means (11) cooperating with the pairs of sealing and countersealing means (7, 8) to provided said alternate reciprocating motions.

11. Vertical form-fill-sealing packaging machine according to the claims 10, wherein both, the sealing and countersealing means (7, 8), are provided at respective opposite ends of supporting rods (9, 10), each of said rods carrying a cam follower engageable with said cam means (11).

* * * * *